United States Patent [19]

Patel et al.

[11] Patent Number: 5,990,188
[45] Date of Patent: *Nov. 23, 1999

[54] RADIATION CURABLE COATINGS WITH IMPROVED WEATHERABILITY

[75] Inventors: Gautam Ambalal Patel, Clifton Park; James Edward Pickett, Schenectady; Gregory Ronald Gillette, Clifton Park; George Frederic Medford, Ballston Lake, all of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/699,254

[22] Filed: Aug. 15, 1996

[51] Int. Cl.$^6$ .......................... C08K 3/36; C08K 5/5397; C08G 77/04; C08L 75/14
[52] U.S. Cl. .................. 522/28; 522/64; 522/75; 522/71; 522/83; 522/84; 522/79; 522/91; 522/96; 528/20; 528/23; 528/26; 428/412; 428/447; 524/611; 524/612; 524/858
[58] Field of Search ..................... 522/84, 75, 64, 522/71, 83, 96, 91, 79, 28; 524/611, 612, 858; 528/20, 23, 26; 428/412, 447

[56] References Cited

U.S. PATENT DOCUMENTS

| | | |
|---|---|---|
| 4,455,205 | 6/1984 | Olson et al. . |
| 4,478,876 | 10/1984 | Chung . |
| 4,486,504 | 12/1984 | Chung . |
| 4,491,508 | 1/1985 | Olson et al. . |
| 4,863,802 | 9/1989 | Moore et al. . |
| 5,162,390 | 11/1992 | Tilley et al. . |
| 5,214,085 | 5/1993 | Patel et al. . |
| 5,318,850 | 6/1994 | Pickett et al. . |
| 5,391,795 | 2/1995 | Pickett . |
| 5,468,789 | 11/1995 | Lewis et al. . |

OTHER PUBLICATIONS

"Photostability of UV Screeners in Polymers and coatings," James E. Pickett; James E. Moore; 1996 American Chemical Society, pp. 81–87.

"Light Stabilisation of Polymers by Radiation–Cured Acrylic Coatings," C. Decker; S. Biry; Progress in Organic Coatings, 1996 Elsevier Science S.A., pp. 287–301.

*Primary Examiner*—Susan W. Berman
*Attorney, Agent, or Firm*—Sterling B. Brown; Noreen C. Johnson

[57] ABSTRACT

The present invention provides the discovery of an improved radiation curable coating composition comprising at least one acrylic monomer, a photoinitiator, and an ultraviolet light absorber selected from triazine or a dibenzoyl resorcinol derivative or a mixture thereof, the dibenzoyl resorcinol derivative having the formula

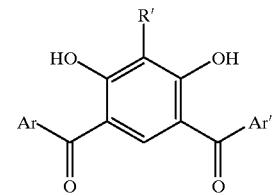

where Ar and Ar' are independently substituted or unsubstituted monocyclic or polycyclic aryl groups and R' is H or a linear or branched alkyl chain having less than about 10 carbons bearing a $-Si(OR^2)_3$, where $R^2$ is a $C_1$ to $C_6$ alkyl group.

4 Claims, No Drawings

RADIATION CURABLE COATINGS WITH IMPROVED WEATHERABILITY

FIELD OF THE INVENTION

The present invention relates to radiation cured coatings which are useful for imparting improved weather resistance and abrasion resistance to solid substrates when applied and cured thereon. In particular, this invention relates to certain ultraviolet light absorbers contained in ultraviolet light cured coating formulations that provide the coatings with greatly improved resistance to microcracking and spontaneous delamination or chalking.

BACKGROUND OF THE INVENTION

Thermoplastic substrates such as polycarbonates and poly (methyl methacrylate) are generally characterized by their many advantageous properties which include clarity, high ductility, high heat deflection temperature, as well as dimensional stability. Many of these materials are transparent and are conventionally employed as replacements for glass in many commercial applications. However, such materials easily scratch and abrade, resulting in possible decrease in transparency. They often display low chemical solvent resistance and are susceptible to degradation by ultraviolet light. This results in unfavorable characteristics including yellowing and erosion of the substrate surface.

As a result, various methods to improve the weatherability and abrasion resistance of thermoplastic substrates have been developed. Such methods conventionally employ treating the thermoplastic substrate surface with a coating material, whereby the coating material typically contains ultraviolet light absorbing agents such as benzophenone and benzotriazole derivatives that decrease yellowing due to weathering conditions. The coating material may also contain a silicon compound for improved abrasion resistance. Coatings with increased abrasion resistance include so-called "silicone hardcoats", which are thermally cured, and silicon compound-containing compositions which are capable of being cured by radiation, such as ultraviolet (UV) radiation.

Ultraviolet light (i.e. radiation curable) curable abrasion resistant coating compositions are dispersions of hard colloidal silica filler in acrylic monomers which can be cured using a free radical type of photo initiator. The ultraviolet radiation-cured coating compositions are advantageous because of their short curing times. These coatings provide increased weatherability, or abrasion resistance or a combination of weatherability and abrasion resistance to the underlying thermoplastic substrate.

Many ultraviolet radiation-curable abrasion-resistant coatings are known in the art. U.S. Pat. No. 4,455,205 discloses compositions comprising a silyl acrylate, aqueous colloidal silica, a photoinitiator and optionally a polyfunctional acrylate. Other materials which may be present include absorbers of ultraviolet radiation, employed as stabilizers, and hindered amines.

Other types of ultraviolet radiation-curable coating compositions are disclosed in U.S. Pat. No. 4,486,504, which contain colloidal silica, a silyl acrylate, a polyfunctional acrylate and a photoinitiator. U.S. Pat. No. 4,491,508 contains colloidal silica, a silyl acrylate, a polyfunctional acrylate and a photoinitiator. Both of these patents also disclose the optional presence of ultraviolet stabilizers or compounds convertible thereto. U.S. Pat. No. 4,863,802 discloses coating compositions of essentially the same types further containing an ultraviolet radiation-absorbing amount of a dimeric benzotriazole compound as a stabilizer. Similar compositions employing acylphosphorus compounds such as 2,4,6-trimethylbenzoyldiphenylphosphine oxide are disclosed in U.S. Pat. No. 5,162,390, which also discloses the use of benzotriazoles and benzophenones as ultraviolet stabilizers.

Recently, it is becoming more and more common for thermoplastic substrates such as polycarbonate to be employed outdoors. It is thus important to impart weatherability properties on the ultraviolet radiation-curable coatings. Weather resistant coating systems can be prepared by incorporating ultraviolet absorbers, such as benzotriazoles and benzophenones, and hindered amine light stabilizers. However, prolonged exposure to sunlight, moisture and thermal cycling conditions can cause yellowing, delamination and formation of microcracks, decreasing transparency. These conditions are often noted in varying degrees in the compositions disclosed in the aforementioned patents, even when one of the properties mentioned is improved weatherability.

The instant invention, therefore, is directed to novel and improved ultraviolet light curable coatings, herein referred to as UV cured coatings, which are capable of absorbing ultraviolet light to increase the weathering characteristics of the coating. The instant invention further provides coating compositions that greatly improve weatherability of the coating and coated article by decreasing yellowing, delamination, and the formation of microcracks, as compared to presently known coatings being used for their weathering characteristics.

SUMMARY OF THE INVENTION

In a first aspect, the present invention provides the discovery of an improved radiation curable coating composition comprising at least one acrylic monomer, a photoinitiator, and an ultraviolet light absorber selected from triazine or a dibenzoyl resorcinol derivative or a mixture thereof, the dibenzoyl resorcinol derivative having the formula

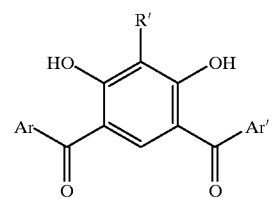

where Ar and Ar' are independently substituted or unsubstituted monocyclic or polycyclic aryl groups and R' is H or a linear or branched alkyl chain having less than about 10 carbons bearing a —Si(OR$^2$)$_3$, where R$^2$ is a C$_1$ to C$_6$ alkyl group, and the triazine absorber having the formula

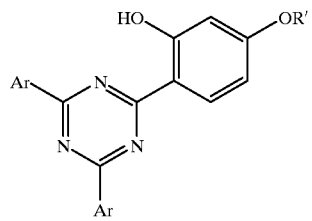

where Ar is an independently substituted or unsubstituted monocyclic or polycyclic aryl group and R' is a linear or branched alkyl chain having 1 to 16 carbon atoms or R' is $CH_2CH(OH)CH_2OR^2$, where $R^2$ is a $C_1$ to $C_{16}$ linear or branched alkyl chain.

A radiation curable coating generally is cured with ultraviolet light and can be referred to as a UV curable coating. Also, the dibenzoyl resorcinol derivative is often a 4,6-dibenzoyl-2-(3-trialkoxysilylalkyl) resorcinol and preferably 4,6-dibenzoyl-2-(3-triethoxysilylpropyl) resorcinol. Examples of triazine materials are Tinuvin 400, a product of Ciba, or Cyagard 1164, a product of Cytec.

In a second aspect of the invention, the ultraviolet light absorbers described above are incorporated into radiation cured silicon compound-containing coating compositions. An example of such a silicon compound would be silyl acrylate modified colloidal silica in hexanediol diacrylate monomer, which is a product of GE Silicones, known as FCS100. Coatings with silicon compounds and the UV light absorbers of the instant invention provide abrasion resistance and improved weatherability characteristics over coating compositions containing benzotriazoles and benzophenones as ultraviolet stabilizers.

In a third aspect of the instant invention, the above-described coating systems are applied to the surface of a solid substrate thus providing a coated solid substrate having improved weatherability, especially resistance to ultraviolet light. Such coated solid substrates may be thermoplastic substrates or weatherable substrates. The thermoplastic substrates that may be employed often include polymer substrates such as polycarbonates and polycarbonate blends, acrylic polymers including poly(methyl methacrylate), polyesters such as poly(ethylene terephthalate) and poly(butylene terephthalate), polyamides, polyimides, acrylonitrile-styrene copolymers, styrene-acrylonitrile-butadiene copolymers, polyvinyl chloride, polystyrene, blends of polystyrene and polyphenylene ethers, butyrates, polyethylene and the like. Thermoplastic substrates can be with or without pigments. Moreover, the solid substrates may also include metal substrates, painted surfaces, glass, ceramics, and textiles. However, the coating compositions of the instant invention are preferably employed to coat polycarbonates.

DESCRIPTION OF THE INVENTION

In the first aspect of the invention, there is provided a radiation curable coating composition comprising (A) at least one acrylic monomer, (B) at least one photoinitiator for ultraviolet light induced curing of said composition, and (C) an effective amount of at least one ultraviolet light absorber selected from triazine or a dibenzoyl resorcinol derivative or a mixture thereof, the dibenzoyl resorcinol derivative having the formula

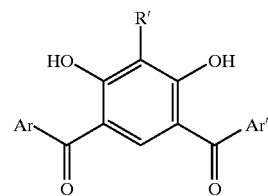

where Ar and Ar' are independently substituted or unsubstituted monocyclic or polycyclic aryl groups and R' is H or a linear or branched alkyl chain having less than about 10 carbons bearing a $—Si(OR^2)_3$, where $R^2$ is a $C_1$ to $C_6$ alkyl group, and the triazine absorber having the formula

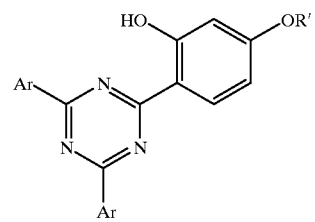

where Ar is an independently substituted or unsubstituted monocyclic or polycyclic aryl group and R' is a linear or branched alkyl chain having 1 to 16 carbon atoms or R' is $CH_2CH(OH)CH_2OR^2$, where $R^2$ is a $C_1$ to $C_{16}$ linear or branched alkyl chain. In addition, the above-mentioned composition may contain an effective amount of at least one hindered amine light stabilizer to inhibit ultraviolet radiation-induced degradation of said composition and a surfactant or leveling agent. The viscosity of the discovered liquid coating composition may be adjusted by diluting it with either low viscosity monoacrylates or diacrylates as reactive dilutents or solvents or both. Other solvents may be used to adjust the viscosity of the coating, such as a mixture consisting of isopropanol and propylene glycol methyl ether. The viscosity of the coating composition is adjusted based on the method of the coating application.

The second aspect of the instant invention is related to the above-mentioned UV curable coating composition with the addition of a silicon compound in the coating formulation. The presence of the silicon compound serves to enhance the abrasion resistance of the coating in applications where scratch and mar resistance are of importance. Often, silyl acrylate is used to make silica acrylate to impart abrasion resistance to the coating composition. Reagents A (the polyfunctional acrylate), B (the photoinitiator), and C (the ultraviolet light absorber selected from triazine or a dibenzoyl resorcinol derivative or a mixture thereof), are also the same in the coating formulations having the silicon compound.

Reagent A in the compositions of this invention is at least one acrylic monomer. The term "acrylic monomer" generally includes esters and amides of acrylic acid, methacrylic acid and homologs and analogs thereof such as ethylacrylic, phenylacrylic or chloroacrylic acid. The preferred acids are acrylic and methacrylic, with acrylic generally being the most preferred. The acrylic monomers are preferably esters; however, "acrylate" as used hereafter includes methacrylates when the corresponding chemical formula so indicates. Other examples of acrylic monomers which can be used to modify the coating compositions are: dipentaerythritol pentaacrylate, pentaerythritol tetraacrylate, di-trimethylolpropane tetraacrylate, trimethylolpropane triacrylate, pentaerythritol triacrylate, tris(2-hydroxy ethyl) isocyanurate triacrylate, 1,6 hexanediol diacrylate, octanediol diacrylate, decanediol diacrylate, tetrahydrofurfuryl acrylate, octyl/decyl acrylate, isobornyl acrylate, cylohexyl acrylate, N-vinylpyrrolidone, aliphatic urethane acrylate oligomers, and aliphatic polyester acrylate oligomers. Urethane acrylates are especially used.

Often, at least a portion of the acrylic ester is a silyl acrylate, which is used to make silyl acrylate modified colloidal silica. The silyl acrylate may be used in the second aspect of this invention. Suitable silyl acrylates include those of the formula

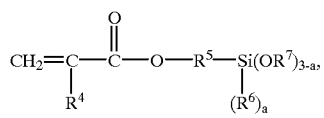

(I)

wherein $R^4$ is hydrogen or methyl, $R^5$ is $C_{1-8}$ alkylene, $R^6$ is $C_{1-13}$ alkyl or aryl, $R^7$ is $C_{1-8}$ alkyl and a is from 0 to 3. Especially preferred are crylates wherein $R^4$ is methyl, $R^5$ is $C_{2-4}$ alkylene and especially trimethylene, $R^7$ is methyl and a is 0.

Reagent A may comprise at least one polyfunctional acrylic monomer. Such monomers include compounds of the formula

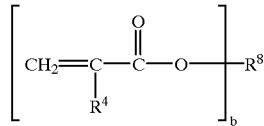

(II)

wherein $R^4$ is as previously defined and in this instance is preferably hydrogen, $R^8$ is a polyvalent organic radical and b is an integer from 2 to 8. The $R^8$ radical is most often an aliphatic radical having about 4–20 carbon atoms. Preferably, b is 5–6 and $R^8$ is alkylene, especially unbranched alkylene such as tetramethylene, hexamethylene or octamethylene. Examples of multifunctional acrylic monomers suitable for this invention are dipentaerythritol monohydroxypenta acrylate (DiPePeta, SR -399, Sartomer Co.), hexafunctional polyurethane acrylate(PU, Ebecryl 1290, UCB Radcure Inc.), and hexafunctional polyester acrylate (PE, Ebecryl 830, UBC Radcure Inc.), and dipentaerythritol hexaacrylate.

Reagent B is at least one initiator for ultraviolet light-induced curing (hereinafter sometimes "photoinitiator") of the coating compositions. Many such photoinitiators are known in the art, and any are suitable for use according to the present invention. The photoinitiator may be chosen from the types disclosed in the aforementioned patents and in U.S. Pat. Nos. 4,478,876 and 5,318,850. Further examples include: combinations of aromatic ketones such as acetophenone, benzophenone, xanthone, benzoin compounds and the like, tertiary amines such as triethanolamine, methyldiethanolamine, and 4-dimethylaminobenzophenone; acylphosphorus compounds, including triorganobenzoyldiarylphosphine oxides, triorganobenzoyldiorgano phosphonates and triorganobenzoyldiarylphosphine sulfides. The acylphosphorus compounds are preferred and 2,4,6-trimethylbenzoyldiphenylphosphine oxide is often especially preferred, which is available as Lucirin® TPO from BASF Corporation.

Other photoinitiators are benzoin derivatives (benzoin isopropyl ether), benzil ketals (Irgacure® 651, Ciba Geigy Corp.) diethoxyacetophenone, (Irgacure ® 184, Ciba Geigy Corp.), substituted α-amino ketones (Irgacure® 907, Ciba Geigy Corp.), and benzoyl oxime derivatives.

Reagent C is an ultraviolet (UV) light stabilizer or absorber of the type mentioned above. The ultraviolet light stabilizers are present in an amount effective to inhibit ultraviolet degradation of the type leading to microcrack formation, delamination and yellowing, but not effective to substantially inhibit ultraviolet-induced curing of the composition. A preferred UV stabilizer is 4,6-dibenzoyl-2-(3-triethoxysilylpropyl)resorcinol.

Hindered amine light stabilizers (HALS) may be any known hindered amine light stabilizer to one skilled in the art that has sufficiently low basicity so as to be compatible with the coating composition matrix. Examples include Tinuvin 123 (Ciba) and Sanduvor 3058 (Clariant). Other low basicity HALS are also expected to be effective in the coating compositions of this invention.

The silicon compound that can be used in the coating formulations of this invention to provide abrasion resistance includes silyl acrylate modified silica, with silica having an average particle size in the range of about 5–80 nm, corresponding to that of colloidal silica, and especially about 15–30 nm being preferred. Colloidal silica is a dispersion of submicron-sized silica particles in an aqueous or other solvent medium; silica concentrations therein are typically in the range of about 15–50 weight percent. When an aqueous silica dispersion is employed in the preparation of the composition of this invention, hydrolysis of at least a portion of the Si—O bonds in the silyl acrylate (when a is less than 3) is possible or even likely. Therefore, the compositions of this invention may include those containing hydrolysis products of said silyl acrylate. An example of silyl acrylate modified colloidal silica is a commercial product that can be used in this invention namely FCS100 manufactured by GE Silicones, which is about 50 weight percent silyl acrylate modified colloidal silica in hexanediol diacrylate monomer. Preparation methods are described in the U.S. Pat. No. 5,468,789.

Generally, the UV curable coating compositions of this invention can include surfactants, leveling agents or mixtures thereof. An example of a surfactant or leveling agent is Ebecryl 1360 a product of UCB Radcure Inc.

In general, the compositions of this invention contain about 50–90 weight percent acrylic monomer. The photoinitiator, generally comprises about 0.5–5.0 weight percent, and the ultraviolet absorber, is most often employed in the amount of about 1–20 percent. The hindered amine, when used, is about 0.1–4.0 weight percent of the composition. Silica acrylate comprises about 5–40 weight percent when added as in the second aspect of the invention.

The compositions of this invention may be prepared by simply blending the various reagents in the desired proportions. If solvents are present and/or colloidal silica is the source of the silicon compound, volatiles may be removed by conventional operations such as vacuum stripping. The composition may then be applied by conventional techniques such as dipping, brushing, roller coating or flow coating to the substrate, which is most often a polycarbonate, polyester or an acrylic resin such as poly (methyl methacrylate). The coating thus formed preferably has a thickness in the range of about 3–25 and typically about 10 microns.

Following application, the composition is cured by exposure to suitable ultraviolet radiation. Curing temperatures are not critical but may be within the range of about 25°–70° C. It is often convenient to employ a continuous line for coating and curing. Solid substrate articles coated with the compositions of this invention, as well as the curing products thereof, are other aspects of the invention.

The invention is illustrated by a series of examples in which ultraviolet light curable coating compositions were based on hexaacrylate polyurethane, silyl acrylate modified colloidal silica, various UV absorbers, both the above-mentioned UV absorbers of this invention and the traditional benzophenone and benzotriazole UV absorbers, a hindered amine light stabilizer, a surfactant, and photoinitiator. The viscosity of the compositions was adjusted by diluting with either monoacrylates as reactive diluents or solvents or both.

EXAMPLES A–F

The coating compositions of examples A–F were based on a hexafunctional polyurethane acrylate (Ebecryl® 1290, UCB Radcure Inc.) which was mixed with 20 wt. % silyl acrylate modified colloidal silica in hexanediol diacrylate monomer (FCS100, GE Silicones). The product FCS100 is about 50 wt. % silyl acrylate modified colloidal silica in hexanediol diacrylate. Weather resistant compositions were formulated using a number of UV absorbers such as 2,4 dihydroxy benzophenone (DHBP), silanated hydroxybenzophenone (SHBP), benzotriazole (Cyagard ® 5411, Cytec Industries Inc.), triazine (Tinuvin® 400, Ciba Geigy Corp.), 4,6-dibenzoylresorcinol (DBR), 4,6-dibenzoyl-2-(3-triethoxysilypropyl) resorcinol (SDBR). In addition, the above compositions contained a hindered amine light stabilizer (Tinuvin® 123, Ciba Geigy Corp.) and a surfactant or leveling agent (Ebecryl® 1360, UCB Radcure Inc.). All compositions used 2, 4, 6-trimethylbenzoyldiphenyl phosphine oxide (Lucirin® TPO, BASF Co.) as a photoinitiator to produce cross-linked coatings. Further, the compositions were diluted with a solvent mixture consisting of isopropanol and propylene glycol methyl ether to adjust the application viscosity. Optionally, monoacrylate reactive diluents can be used to adjust the viscosity of coating compositions. The details of formulations are summarized in Table 1. All UV absorbers were used at 5.5 to 6 phr (parts per hundred resin solids) level where solids consisted of acrylic modified colloidal silica plus acrylate monomers.

TABLE 1

| Coating Compositions (all parts by weights) | | | | | | |
|---|---|---|---|---|---|---|
| | A | B | C | D | E | F |
| Polyurethane hexaacrylate | 8 | 8 | 8 | 8 | 8 | 8 |
| FCS100 | 2 | 2 | 2 | 2 | 2 | 2 |
| 2,4 dihydroxybenzophenone (DHBP) | 0.6 | — | — | — | — | — |
| Silanated hydroxybenzophenone (SHBP) | — | 0.6 | — | — | — | — |
| Benzotriazole/Benzophenone (Cyasorb ® 5411/Cyagard ® 531) | — | — | 0.4/ 0.15 | — | — | — |
| Triazine (Tinuvin ® 400) | — | — | — | 0.6 | — | — |
| Dibenzoyl Resorcinol "DBR" | — | — | — | — | 0.6 | — |
| Silanated dibenzoyl | — | — | — | — | — | 0.6 |

TABLE 1-continued

| Coating Compositions (all parts by weights) | | | | | | |
|---|---|---|---|---|---|---|
| | A | B | C | D | E | F |
| resorcinol "SDBR" | | | | | | |
| Hindered Amine Light Stabilizer (Tinuvin ® 123 Ciba Geigy Corp.) | 0.1 | 0.1 | 0.1 | 0.1 | 0.1 | 0.1 |
| Surfactant | 0.015 | 0.015 | 0.015 | 0.015 | 0.015 | 0.015 |
| 2,4,6 Trimethylbenzoyldiphenyl-Phosphine oxide | 0.3 | 0.3 | 0.3 | 0.3 | 0.3 | 0.3 |
| Isopropanol/propylene glycol Methyl ether (1:1 by wt.) | 20 | 20 | 20 | 20 | 20 | 20 |

The above compositions were flow coated on 4"×6"×0.125" Lexan 9030® panels, subsequently air dried for 1 minute and dried in a convection oven for 4 minutes at 65° C. to remove solvents. Coatings were cured using a UV processor equipped with two 300 watts/inch medium pressure mercury lamps by passing the coated panels under UV light six times at a conveyor belt speed of 25 ft./min. in an air atmosphere. All compositions provided optically clear coatings. Cured coating thickness was about 10 to 15 microns.

Coatings containing different UV absorbers were weathered in the xenon arc accelerated weatherometer. Optical properties such as % light transmission, % haze and yellowness index (YI) were measured periodically. Further, cross-hatch adhesion was evaluated using the tape pull test (3M) and coatings were visually examined for microcracking and spontaneous delamination or chalking. The weathering results for various failures are summarized in Table 2 in terms of the UV light exposure at 340 nm.

TABLE 2

| Xenon-arc* Weathering Exposure to Fail (kJoule/m² at 340 nm) | | | | | |
|---|---|---|---|---|---|
| Composition | UV Absorber | Microcracking | YI > 5 | % Haze > 10 | Delamination or Chalking |
| A | DHBP | 3985 | 5180 | 6376 | 7976 |
| B | SHBP | 3188 | 4.4 at 4782 | % Haze 7.3 at 4782 | 4782 |
| C | Benzotriazole/ Benzophenone | 3985 | 5180 | 6376 | 7179 |
| D | Triazine | 7179 | 6777 | 7976 | >10,000 |
| E | DBR | 4782 | 5579 | 6376 | 10,367 |
| F | SDBR | 8773 | 9171 | 9570 | 13,555 |

*Atlas Ci35a Xenon Arc Weather-Ometer®. Type 'S' borosilicate inner/outer filters. Irradiance level 0.77 W/m² at 340 nm, black panel temperature 70–73° C., dry bulb temperature 45° C., 50% RH. Cycle consisted of 60 minutes light, 5 minutes dark, 15 minutes dark with water spray. Yellowness index (YI) and % haze values measured using Pacific-Scientific XL-835 calorimeter.

The above results for coating compositions A–F, show the superior weathering results obtained for the UV absorbers of the instant invention which are shown in examples D, E, and F. The prior art UV absorbers used in radiation cured coating formulations are given in examples A, B, and C.

What is claimed:

1. A radiation curable coating composition comprising about 5–40 weight % silyl acrylate modified colloidal silica, silica having an average particle size in the range of about 15–30 nm where said silica is silane functionalized colloidal silica in hexanediol diacrylate, about 50–90 weight % hexafunctional polyurethane acrylate, about 0.5–5.0 weight % 2, 4, 6-trimethylbenzoyltriphenylphosphine oxide, about 1–20 weight % UV absorber dibenzoyl resorcinol derivative having the formula

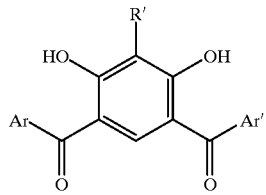

where Ar and Ar' are independently substituted or unsubstituted monocyclic or polycyclic aryl groups and R' is H or a linear or branched alkyl chain having less than about 10 carbons bearing a —$Si(OR^2)_3$, where $R^2$ is a $C_1$ to $C_6$ alkyl group, about 0.1–4.0 weight % hindered amine light stabilizer, and a surfactant or leveling agent, where said coating is diluted with an alcohol or a glycol ether solvent or mixtures thereof.

2. A solid substrate coated with the composition of claim 1.

3. An article obtained by ultraviolet curing of the solid substrate according to claim 2.

4. A thermoplastic substrate coated with a UV cured coating prepared by curing the composition of claim 1.

* * * * *